United States Patent
Tanaka et al.

[11] Patent Number: 5,867,704
[45] Date of Patent: Feb. 2, 1999

[54] MULTIPROCESSOR SYSTEM SHAVING PROCESSOR BASED IDLE STATE DETECTION AND METHOD OF EXECUTING TASKS IN SUCH A MULTIPROCESSOR SYSTEM

[75] Inventors: Tetsuya Tanaka, Osaka; Akira Fukuda, Fukuoka-ken; Hitoshi Tanuma, Osaka, all of Japan

[73] Assignee: Matsushita Electric Industrial Co., Ltd., Kadoma, Japan

[21] Appl. No.: 605,366

[22] Filed: Feb. 22, 1996

[30] Foreign Application Priority Data

Feb. 24, 1995 [JP] Japan .................................. 7-036836

[51] Int. Cl.⁶ ............................................. G06F 9/00
[52] U.S. Cl. ................................... 395/675; 395/676
[58] Field of Search ................................. 395/675, 672, 395/670, 673, 678, 674

[56] References Cited

U.S. PATENT DOCUMENTS

| | | | |
|---|---|---|---|
| 4,954,945 | 9/1990 | Inoue ........................................ | 395/675 |
| 5,159,686 | 10/1992 | Chastain et al. ......................... | 395/675 |
| 5,404,521 | 4/1995 | Murray ...................................... | 395/650 |
| 5,604,865 | 2/1997 | Lentz et al. ............................... | 395/311 |
| 5,640,563 | 6/1997 | Carmon ..................................... | 395/672 |

*Primary Examiner*—Majid A. Banankhan
*Attorney, Agent, or Firm*—Renner, Otto, Boisselle & Skylar, P.L.L.

[57] ABSTRACT

The present invention provides a method for executing tasks in a multiprocessor system including a plurality of processors, each processor taking either an "idle" state and a "run" state, wherein the method includes the steps of: detecting, when a first processor among the plurality of processors that is executing a first task newly generates a second task, whether or not a second processor taking the "idle" state exists among the plurality of processors; assigning the second task, if a second processor taking the "idle" state is detected, to the second processor, so as to begin execution of the second task by the second processor, change the state of the second processor from the "idle" state to the "run" state, and store a flag having a first value indicating that the execution of the first task has not been suspended; and suspending, if no second processor taking the "idle" state is detected, the execution of the first task by the first processor, beginning execution of the second task by the first processor, and storing a flag having a second value indicating that the execution of the first task has been suspended.

14 Claims, 11 Drawing Sheets

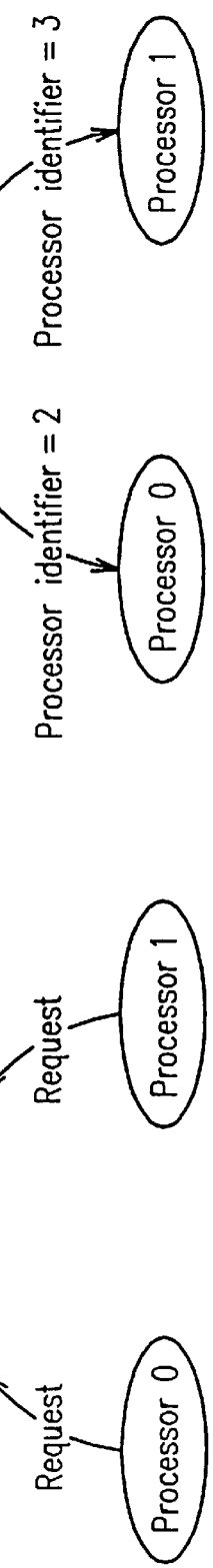

| | |
|---|---|
| IDLE | Idle |
| RUN | Run |

| | |
|---|---|
| STOP | Waiting to be executed or having been executed |
| EX1 | Executed (no other task interrupted) |
| EX2 | Executed (another task interrupted) |

MULTIPROCESSOR SYSTEM SHAVING PROCESSOR BASED IDLE STATE DETECTION AND METHOD OF EXECUTING TASKS IN SUCH A MULTIPROCESSOR SYSTEM

BACKGROUND OF THE INVENTION

1. Field of the Invention

The present invention relates to a multiprocessor system including a plurality of processors which execute tasks in parallel, and a method for executing tasks in the multiprocessor system.

2. Description of the Related Art

In recent years, multiprocessor systems have attracted attention as one approach for enhancing the performance of parallel processing of a common computer. The type of multiprocessor system configuration which is most frequently adopted is called a shared-memory type, in which a plurality of processors are connected to one bus so as to share a main storage device.

In such a multiprocessor system, a plurality of processor chips are usually mounted on a printed circuit board. Therefore, the speed of communication and synchronization between processors, which utilizes buses, is slower than the processing speeds of the processors. Therefore, such a multiprocessor system is used in the ease where the processing time of tasks (which are individual units of processing) is sufficiently larger than the time required for the communication and synchronization between processors. Such tasks, consisting of a few thousand instructions or more, are said to have a medium to large coarseness degree. By thus increasing the unit of processing (i.e., increasing the coarseness degree), the time required for the communication and synchronization between processors becomes small relative to the actual execution of the task.

In addition, the integration techniques for semiconductor devices have been rapidly improving in recent years. As a result, it has become possible to incorporate a large number of functional units and memories within one chip. Applied to multiprocessor systems, incorporating a plurality of processors in one chip will become possible in the future. In such cases, the bus connected to the processors will also be included in the chip, so that tasks of a broader range of coarseness degrees can be executed in the chip by the enhancement of the speed of communication and synchronization between processors. In other words, parallel-processing of a few dozen to a few thousand instructions is deemed to be possible. It is predicted that parallel-processing of such tasks (having small coarseness degrees) will form a main-stream in the future. One reason thereof is that so-called object-oriented programming and programming based on function-type languages, which have recently attracted a large attention, are in line with "parallel-processing tasks of small coarseness degrees".

On the other hand, a plurality of tasks are to be assigned to a limited number of processors in a multiprocessor system, so that it is commonplace to determine the execution order of tasks and appropriately select tasks to be assigned to particular processors. In order to realize this operation in a dynamic manner, a task which is waiting to be axqcuto is first stored in a task management device, e.g., a primary storage, and thereafter idle processors are detected. If an idle processor exists, one of the tasks waiting to be executed is selected to be executed and is assigned to the idle processor. The task selection is performed for the purpose of minimizing the execution time of the entire job. The process of determining the execution order of tasks and determining which tasks should be assigned to which processors is called scheduling, and various algorithms with different determination methods are known for such scheduling processes. In another process method, when a task to be executed is generated through task generation, that task is registered in a task management device as a task waiting for execution.

FIG. 12 is a diagram showing the operation of a conventional method of processor assignment for a multiprocessor system. In FIG. 12, the processor 2 generates a task 4, which is registered in the task management device as a task waiting to be executed. When the processor 0 detects that the processor 1 is "idle", one of the tasks in the task management device waiting to be executed is selected in accordance with a given scheduling algorithm, and is assigned to the processor 1 by the processor 0. At this time, the processor 0 is performing the scheduling process and the processor 2 is performing the task registration process.

This is true of a method described in Japanese Laid-Open Patent Publication No. 63-208948, where an idle processor (corresponding to the processor 1 in FIG. 12) monitors task ready queue (the task management device in FIG. 12) so as to automatically take out a task waiting to be executed. An "idle" processor is similarly performing a scheduling process.

Another method is described in No. 62-190548, where a processor which entrusted a task to another processor monitors the state of the task in the entrusted processor, so that when the entrusted processor's completion of the task is detected, another task is selected and assigned to the entrusted processor, which has become idle. In this method, the processor which entrusted a task to the other processor performs the process of monitoring the state of the entrusted processor.

The scheduling process, the task registration process, and the process of monitoring an entrusted processor described above can all be considered to be an overhead until the task is assigned to a processor and executed, that is, an overhead accompanying task processes, although meant for different purposes. FIG. 13 is a timing diagram showing the process time of tasks and the overhead processing time. As shown in FIG. 13, the overhead processing time is small relative to the actual task execution time in tasks having medium to large coarseness degrees, so that the overhead processing time is negligible.

However, when tasks of small coarseness degrees are parallel-processed by enhancing the speed of communication and synchronization between processors in a multiprocessor system having an overhead inherent to the above-described task processing, the. overhead processing time becomes large relative to the task processing time.

FIG. 14 is a timing diagram showing the process time of tasks and the overhead processing time of a task having a small coarseness degree. As shown in FIG. 14, the overhead processing time is large relative to the actual task execution time in tasks having medium to large coarseness degrees, so that the overhead processing time becomes unnegligible. As a result, the processing time of the entire job becomes large.

SUMMARY OF THE INVENTION

In one aspect, the present invention provides a method for executing tasks in a multiprocessor system including a plurality of processors, each processor taking either an "idle" state and a "run" state, wherein the method includes the steps of: detecting, when a first processor among the plurality of processors that is executing a first task newly generates a second task, whether or not a second processor taking the "idle" state exists among the plurality of processors; assigning the second task, if a second processor taking the "idle" state is detected, to the second processor, so as to begin execution of the second task by the second processor, change the state of the second processor from the "idle" state to the "run" state, and store a flag having a first value indicating that the execution of the first task has not been suspended; and suspending, if no second processor taking the "idle" state is detected, the execution of the first task by the first processor, beginning execution of the second task by the first processor, and storing a flag having a second value indicating that the execution of the first task has been suspended.

In one embodiment of the invention, the method further includes the steps of: determining whether the flag has the first value or the second value after the execution of the second task is completed; changing, if the flag is determined to have the first value, the state of the second processor from the "run" state to the "idle" state; and restarting, if the flag is determined to have the second value, the execution of the first task by the first processor where the execution of the first task was suspended.

In another embodiment of the invention, each of the plurality of processors has an identifier for identifying the plurality of processors from one another, and the detection of the second processor taking the "idle" state is performed by using the identifiers.

In still another embodiment of the inventsion, each of the plurality of processors has a priority value for determining the priority thereof in task assignment, and the assignment of the second task to the second processor is performed based on the priority values.

Alternatively, the present invention provides a method for executing tasks in a multiprocessor system including a plurality of processors, each processor taking either an "idle" state and a "run" state, and each task taking either a "stopped" state, a first "executed" state and a second "executed" state, wherein the method includes the steps of: detecting, when a first processor among the plurality of processors that is executing a first task newly generates a second task, whether or not a second processor taking the "idle" state exists among the plurality of processors; assigning the second task, if a second processor taking the "idle" state is detected, to the second processor, so as to begin execution of the second task by the second processor, change the state of the second processor from the "idle" state to the "run" state, and change the state of the second task from the "stopped" state to the first "executed" state; and suspending, if no second processor taking the "idle" state is detected, the execution of the first task by the first processor, beginning execution of the second task by the first processor, and changing the state of the second task from the "stopped" to the second "executed" state.

In one embodiment of the invention, the method further includes the steps of: determining the state of the second processor after the execution of the second task is completed; changing, if the second task is determined to be in the first "executed" state, the state of the second processor from the "run" state to the "idle" state and changing the state of the second task from the first "executed" state to the "stopped" state; and changing, if the second task is determined to be in the second "executed" state, the state of the second task from the second "executed" state to the "stopped" state.

In another embodiment of the invention, each of the plurality of processors has an identifier for identifying the plurality of processors from one another, and the detection of the second processor taking the "idle" state is performed by using the identifiers.

In still another embodiment of the invention, each of the plurality of processors has a priority value for determining the priority thereof in task assignment, and the assignment of the second task to the second processor is performed based on the priority values.

In another aspect of the present invention, a multiprocessor system is provided which includes: a plurality of processors for parallel-processing a plurality of tasks; and a state managing device for managing states of the plurality of processors and returning an identifier of a processor in an "idle" state in response to an inquiry made by each of the plurality of processors, wherein each of the plurality of processors inquires to the state management device as to whether or not a processor in the "idle" state exists when a new task has been generated.

In one embodiment of the invention, the state management device includes means for changing a current state to a next state in response to the inquiry made by the processor and means for outputting a response to the inquiry based on the next state.

In another embodiment of the invention, the multiprocessor system further includes an instruction cache memory and a data cache memory for each of the plurality of processors.

In still another embodiment of the invention, the multiprocessor system further includes a network for transferring an instruction address and a packet address among the plurality of processors.

In still another embodiment of the invention, each of the plurality of tasks has a small coarseness degree.

Thus, the invention described herein makes possible the advantage of providing a method for parallel-processing tasks of small coarseness degrees in a multiprocessor system having an enhanced speed of communication and synchronization between prccessors. In accordance with the method of the present invention, the above-mentioned overhead is eliminated by omitting any task management, scheduling, or monitoring of task states. Instead, the present invention achieves a dynamic task assignment for processors by a unified, simple, and fast method.

These and other advantages of the present invention will become apparent to those skilled in the art upon reading and understanding the following detailed description with reference to the accompanying figures.

BRIEF DESCRIPTION OF THE DRAWINGS

FIG. 4A and 4B are diagrams describing an exemplary operation of the processor state management device 22.

DESCRIPTION OF THE PREFERRED EMBODIMENTS

Hereinafter, the present invention will be described by way of examples, with reference to the accompanying figures.

Figure 1:
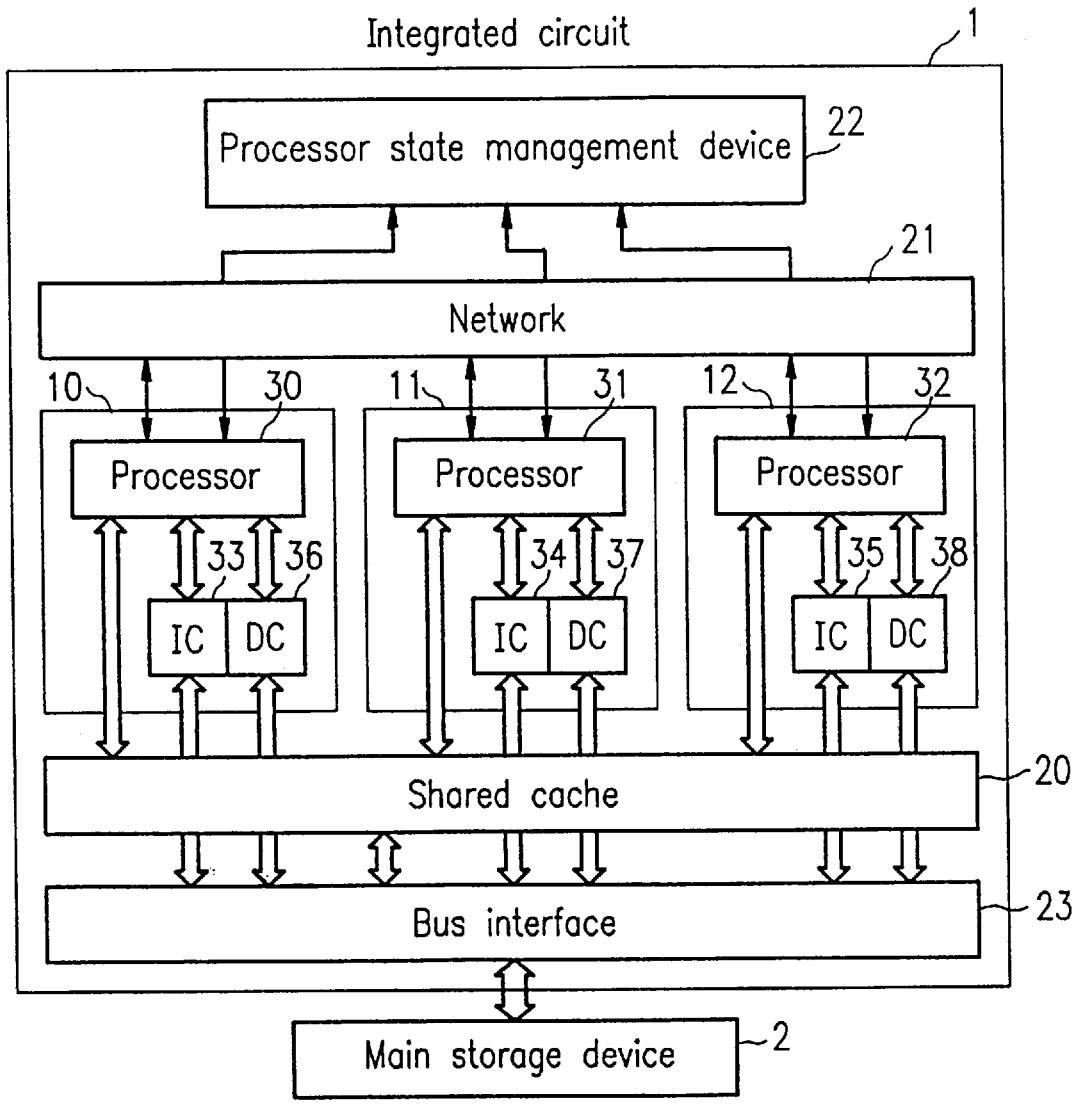
FIG. 1 is a view showing the configuration of a multiprocessor system 1 according to the present invention.

FIG. 1 shows the configuration of a multiprocessor system 1 according to the present invention. The multiprocessor system 1 is implemented on an integrated circuit. The multiprocessor system 1 is connected to a main storage device 2 via a bus.

The multiprocessor system 1 includes element processor units 10 to 12. The element processor units 10 to 12 have the same configuration. The number of element processor units to be included in the multiprocessor system 1 is not limited to three. The multiprocessor system 1 can include any number of element processor units.

The element processor units 10 to 12 include processors 30 to 32 (respectively), instruction caches (IC) 33 to 35 (respectively), and data caches (DC) 36 to 38 (respectively). The instruction caches (IC) are read-only cache memories for storing instructions. The data caches (DC) are readable/writable cache memories for storing data.

A shared cache 20 is shared by the element processor units 10 to 12. Instruction sets and data sets are usualiy stored in the main storage deviece 2. The data sets are loaded in the shared cache 20 via a bus interface 23 as necessary. It is preferable that the shared cache 20 is capable of operating considerably faster than the main storage device 2. The data caches (DC) and the shared cache 20 are selectively used depending on the address. For example, the data caches (DC) are accessed for an address in the range of 0x00000000 to 0x7fffffff, and the shared cache 20 is accessed for an address in the range of 0x80000000 to 0xffffffff.

The element processor units 10 to 12 are interconnected to one another via a network 21. The network 21 is employed for transferring instruction addresses and packet addresses among element processor units 10 to 12. The network 21 can be implemented as a 3×3 cross-bar switch.

The processor state management device 22 manages the states of the processors 30 to 32. Each of the processors 30 to 32 takes either a "run" state or an "idle" state.

A fixed priority is assigned to each of the processors 30 to 32. Herein, it is assumed that the processors 30 to 32 have increasingly smaller priority values in this order (i.e., the processor 30 has a higher priority than that of the processor 31; the processor 31 has a higher priority than that of the processor 32;). The priority values are employed, in a case where a plurality of processors access the processor state management device 22 at the same time, in order to determine which processor should be allowed to have a priority in accessing the processor state management device 22.

Each of the processors 30 to 32 has an identifier (ID) for identifying the processors 30 to 32 from one another. The identifiers (ID) are typically expressed in the form of numbers.

Each of the processors 30 to 32 has the address of a packet inside. The address of the packet in the processor is retained, for example, in a register (not shown) inside the processor 30, 31, or 32. Thus, the processors 30 to 32 can refer to packets. The packets will be described later in detail with reference to FIG. 6.

The multiprocessor system 1 has the function of performing a plurality of tasks in parallel. For example, the processor 30 can perform a task T1 while the processor 31 performs a task T2.

In the present specification, a "task" is defined as a pair consisting of an instruction set and a data set. The instruction set and the data set are both stored in the main storage device 2.

Each of the processors 30 to 32 sequentially reads instructions from the instruction set of a task, and interprets and executes the instructions which have been read. The data set is referred to, if necessary, when the processors 30 to 32 interpret and execute the instructions which have been read. A packet (described later) is at least part of the data set.

Figure 2:
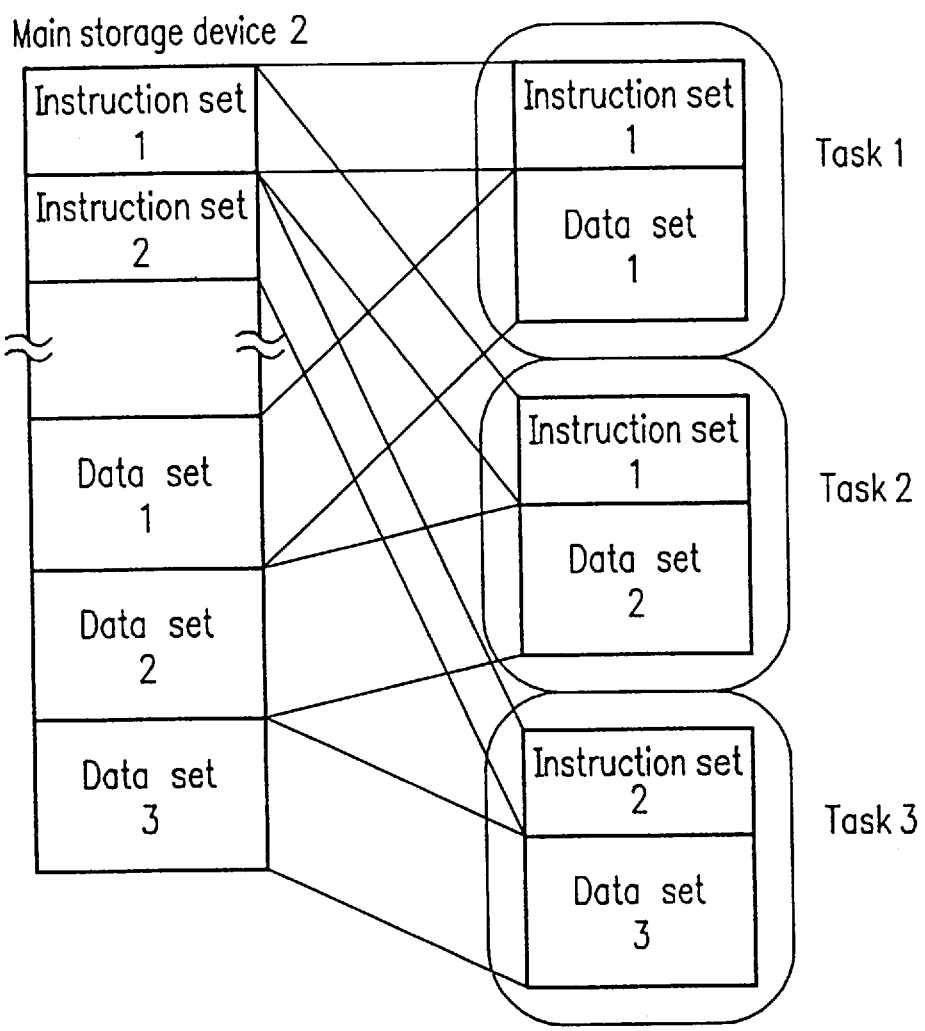
FIG. 2 is a diagram schematically showing the concept of tasks.

FIG. 2 is a schematic diagram showing the concept of a "task". In this example, Task 1 is defined as a pair of an instruction set 1 and a data set 1; Task 2 is defined as a pair of an instruction set 1 and a data set 2; and Task 3 is defined as a pair of an instruction set 2 and a data set 3. The instruction sets 1 and 2 and the data sets 1 to 3 are all stored in the main storage device 2.

Figure 3:
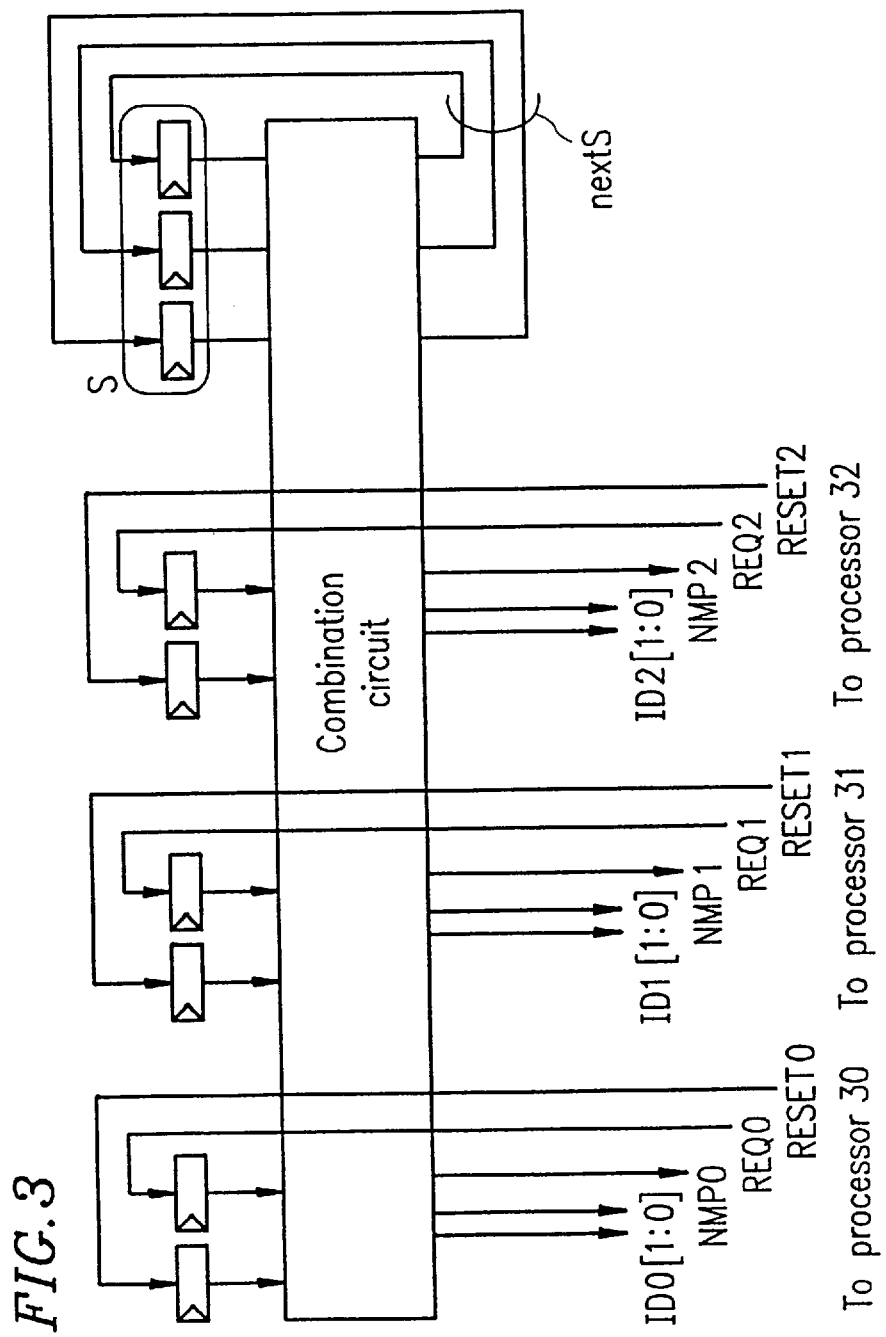
FIG. 3 is a diagram showing an exemplary configuration of a processor state management device 22 in the multiprocessor system 1.

FIG. 3 shows an exemplary configuration of the processor state management device 22 for managing the states of the processors 30 to 32. The processor state management device 22 includes a combination circuit which provides an output (ID0 to ID2, NMP0 to NMP2) in response to an input (REQ0 to REQ2, RESET0 to RESET2). The combination circuit determines a next state (nextS) in accordance with a current state (S) and the input (REQ0 to REQ2, RESET0 to RESET2), and provides an output (ID0 to ID2, NMP0 to NMP2) corresponding to the next state. The transition from the current state (S) to the next state (nextS) is determined in accordance with a state transition table, for example, shown in Table 1.

TABLE 1

| S | REQ | RESET | next5 | ID0 | NMP0 | ID1 | NMP1 | ID2 | NMP2 |
|---|-----|-------|-------|-----|------|-----|------|-----|------|
| 001 | 001 | 000 | 011 | 01 | 0 | — | — | — | — |
| 010 | 010 | 000 | 011 | — | — | 00 | 0 | — | — |
| 100 | 100 | 000 | 101 | — | — | — | — | 00 | 0 |

TABLE 1-continued

| S | REQ | RESET | next5 | ID0 | NMP0 | ID1 | NMP1 | ID2 | NMP2 |
|---|-----|-------|-------|-----|------|-----|------|-----|------|
| 011 | 001 | 000 | 111 | 10 | 0 | — | — | — | — |
| 011 | 010 | 000 | 111 | — | — | 10 | 0 | — | — |
| 011 | 011 | 000 | 111 | 10 | 0 | — | 1 | — | — |
| 101 | 001 | 000 | 111 | 01 | 0 | — | — | — | — |
| 101 | 100 | 000 | 111 | — | — | — | — | 01 | 0 |
| 101 | 101 | 000 | 111 | 01 | 0 | — | — | — | 1 |
| 110 | 010 | 000 | 111 | — | — | 00 | 0 | — | — |
| 110 | 100 | 000 | 111 | — | — | — | — | 00 | 0 |
| 110 | 110 | 000 | 111 | — | — | 00 | 0 | — | 1 |
| 111 | 001 | 000 | 111 | — | 1 | — | — | — | — |
| 111 | 010 | 000 | 111 | — | — | — | 1 | — | — |
| 111 | 100 | 000 | 111 | — | — | — | — | — | 1 |
| 111 | 011 | 000 | 111 | — | 1 | — | 1 | — | — |
| 111 | 101 | 000 | 111 | — | 1 | — | — | — | 1 |
| 111 | 110 | 000 | 111 | — | — | — | 1 | — | 1 |
| 111 | 111 | 000 | 111 | — | 1 | — | 1 | — | 1 |
| 011 | 000 | 001 | 010 | — | — | — | — | — | — |
| 011 | 000 | 010 | 001 | — | — | — | — | — | — |
| 011 | 001 | 010 | 101 | 10 | 0 | — | — | — | — |
| 011 | 010 | 001 | 110 | — | — | 10 | 0 | — | — |
| 101 | 000 | 001 | 100 | — | — | — | — | — | — |
| 101 | 000 | 100 | 001 | — | — | — | — | — | — |
| 101 | 001 | 100 | 011 | 01 | 0 | — | — | — | — |
| 101 | 100 | 001 | 110 | — | — | — | — | 01 | 0 |
| 110 | 000 | 010 | 100 | — | — | — | — | — | — |
| 110 | 000 | 100 | 010 | — | — | — | — | — | — |
| 110 | 010 | 100 | 011 | — | — | 00 | 0 | — | — |
| 110 | 100 | 010 | 101 | — | — | — | — | 00 | 0 |
| 111 | 000 | 001 | 110 | — | — | — | — | — | — |
| 111 | 000 | 010 | 101 | — | — | — | — | — | — |
| 111 | 000 | 100 | 011 | — | — | — | — | — | — |
| 111 | 000 | 011 | 100 | — | — | — | — | — | — |
| 111 | 000 | 101 | 010 | — | — | — | — | — | — |
| 111 | 000 | 110 | 001 | — | — | — | — | — | — |
| 111 | 001 | 010 | 101 | — | 1 | — | — | — | — |
| 111 | 001 | 100 | 011 | — | 1 | — | — | — | — |
| 111 | 001 | 110 | 001 | — | 1 | — | — | — | — |
| 111 | 010 | 001 | 110 | — | — | — | 1 | — | — |
| 111 | 010 | 100 | 011 | — | — | — | 1 | — | — |
| 111 | 010 | 101 | 010 | — | — | — | 1 | — | — |
| 111 | 100 | 001 | 110 | — | — | — | — | — | 1 |
| 111 | 100 | 010 | 101 | — | — | — | — | — | 1 |
| 111 | 100 | 011 | 100 | — | — | — | — | — | 1 |
| 111 | 011 | 100 | 011 | — | 1 | — | 1 | — | — |
| 111 | 101 | 010 | 101 | — | 1 | — | — | — | 1 |
| 111 | 110 | 001 | 110 | — | — | — | 1 | — | 1 |

In FIG. 3, S represents the current state, and NextS represents the next state. These states represent the respective states of the processors 30 to 32. For example, S=001 indicates that the processor 30 is in a "run" state, and the states qf the processors 31 and 32 are in an "idle" state. The same also applies to NextS.

In FIG. 3, REQ0 to REQ2 represent requests which are input from the processors 30 to 32 to the processor state management device 22. These requests are input in order to request the processor state management device 22 for the identifier of an "idle" processor. In Table 1, REQ0 to REQ2 are collectively represented as REQ. For example, REQ=101 indicates that REQ0 is "1" (i.e., asserted); REQ1 is "0" (i.e., negated); and REQ2 is "1" (i.e., asserted).

In FIG. 3, RESET0 to RESET2 represent resets which are input from the processors 30 to 32 to the processor state management device 22. These resets are input in order to request the processors 30 to 32 to change the states of the processors 30 to 32 retained in the processor state management device 22 from "run" to "idle". In Table 1, RESET0 to RESET2 are collectively represented as RESET. For example, RESET=010 indicates that RESET0 is "0" (i.e., negated); RESET1 is "1" (i.e., asserted); and RESET2 is "0" (i.e., negated).

In FIG. 3, ID0 to ID2 each represent a signal which informs the identifier of an "idle" processor in response to a request made by the processor 30, 31, or 32. These signals are output from the processor state management device 22 in response to requests made by the processors 30 to 32. The meanings of values of ID0 to ID2 are as follows:

00: The processor 30 is "idle".

01: The processor 31 is "idle".

10: The processor 32 is "idle".

In FIG. 3, NMP0 to NMP2 represent signals which inform that "no idle processor exists" in response to requests made by the processors 30 to 32. These signals are output from the processor state management device 22 in response to requests made by the processors 30 to 32. The meanings of values of NMP0 to NMP2 are as follows:

0: An "idle" processor exists. The identifier of the "idle" processor is indicated by the values of ID0 to ID02.

1: No "idle" processor exists. In this case, the values of ID0 to ID02 are not important (i.e., "don't care").

Hereinafter, the function and operation of the processor state management device 22 will be described with reference to FIGS. 4A, 4B, 5A and 5B. The processor state management device 22 manages the states of all the processors included in the multiprocessor system. Specifically, the processor state management device 22 retains pairs each consisting of the identifier of a processor and the state of that processor. The identifiers of the processors are used for identifying the processors from one another. The identifiers of processors are typically expressed in the form of integers. Each processor takes either a "run" state or an "idle" state.

The processor state management device 22 determines whether or not an "idle" processor exists in response to a request made by a processor. If an "idle" processor exists, the processor state management device 22 returns the identifier of the "idle" processor to the processor which made the request. If no "idle" processor exists, the processor state management device 22 returns a message that "no idle processor exists" to the processor which made the request.

In the case where a plurality of "idle" processors exist, the processor state management device 22 returns the identifier of the "idle" processor that has the highest priority to the processor which made the request. In the case where requests by a plurality of processors simultaneously reach the processor state management device 22, the above-described process is performed for the processors which made such requests in the descending order of their priorities.

FIGS. 4A and 4B show an exemplary operation of the processor state management device 22. The processor state management device 22 manages the states of four processors 0 to 3. In the example shown in FIG. 4A, the processors 0 and 1 are in a "run" state, and the processors 2 and 3 are in an "idle" state. A request made by the processor 0 and a request made by the processor 1 are input to the processor state management device 22.

The processor state management device 22 returns the identifier of the "idle" processor 2 in response to the request made by the processor 0, and returns the identifier of the "idle" processor 3 in response to the request made by the processor 1 (see FIG. 4B). The identifiers of the "idle" processors are returned in accordance with the priorities of the processors. Moreover, the processor state management device 22 changes the state of the processor 2 stored in the processor state management device 22 from "idle" to "run", and the state of the processor 3 stored in the processor state management device 22 from "idle" to "run".

Figure 5B:
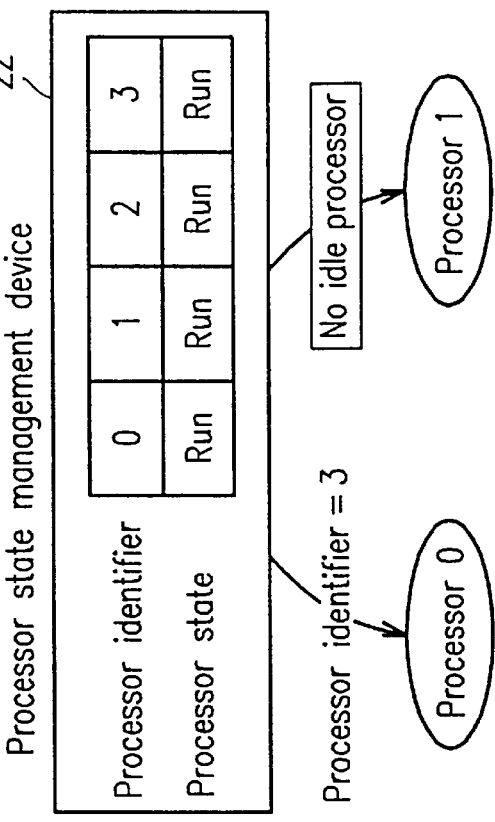
FIGS. 5A and 5B are diagrams describing another exemplary operation of the processor state management device 22.
Figure 5A:
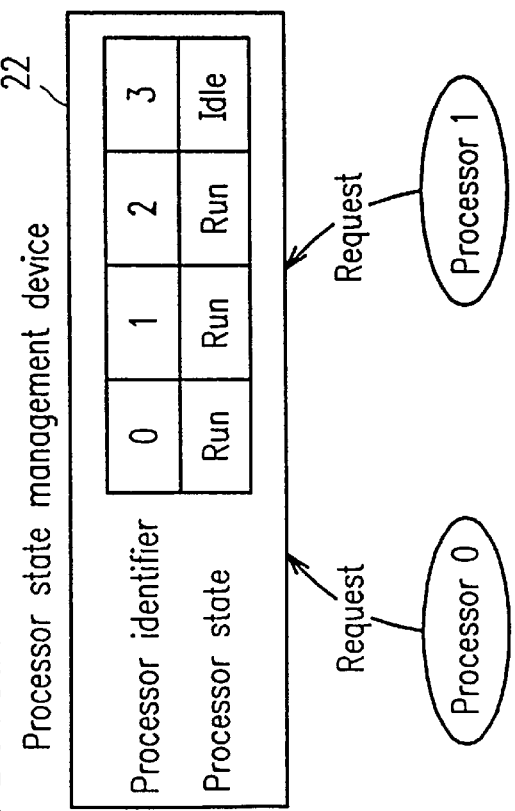

FIGS. 5A and 5B show another exemplary operation of the processor state management device 22. The processor state management device 22 manages the states of four processors 0 to 3. In the example shown in FIG. 5A, the processors 0, 1, and 2 are in a "run" state, and the processor 3 is in an "idle" state. A request made by the processor 0 and a request made by the processor 1 are input to the processor state management device 22.

The processor state management device 22 returns the identifier of the "idle" processor 3 in response to the request made by the processor 0, and returns a message that "no idle processor exists" in response to the request made by the processor 1 (see FIG. 5B). The message that "no idle processor exists" is expressed, for example, by the value of a return code output from the processor state management device 22. The identifiers of the "idle" processors are returned in accordance with the priorities of the processors. Moreover, the processor state management device 22 changes the state of the processor 3 stored in the processor state management device 22 from "idle" to "run".

In the examples shown in FIGS. 4A, 4B, 5A, and 5B, four processors are managed by the processor state management device 22. However, this is for the sake of conciseness; the present invention is not limited to a multiprocessor system which includes four processors. The present invention can be applied to a multiprocessor system including any number of processors.

Figure 6:
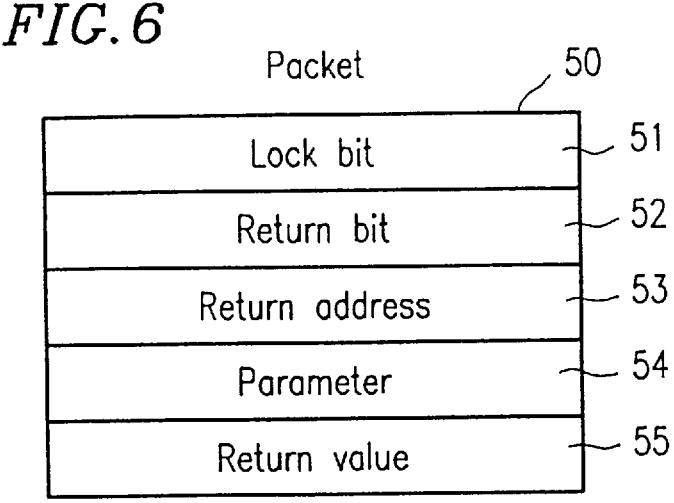
FIG. 6 is a diagram showing the configuration of a packet 50.

FIG. 6 shows the structure of a packet 50. The packet 50 includes a lock bit region 51 for storing a lock bit, a return bit region 52 for storing a return bit, and a return address region 53 for storing a return address, a parameter region 54 for storing a parameter, and a return value region 55 for storing a return value. Such a packet 50 is secured in the shared memory 20 for each task, the packet 50 being owned by the task. Hereinafter, a "packet owned by a task" will simply be referred to as a "packet of a task". The packet 50 is used for exchanging data between tasks and retaining the information of tasks.

A lock bit is stored in the lock bit region 51 of the packet 50. The lock bit indicates whether or not other tasks are inhibited from accessing a task which owns the packet 50 while the task owning the packet 50 is being executed. If the lock bit is "1", it indicates that such access is inhibited. If the lock bit is "0", it indicates that such access is not inhibited.

A return bit is stored in the return bit region 52 of the packet 50. Return bit indicates whether or not any other task was suspended before executing a task which owns the packet 50. If the return bit is "0", it indicates that "no other task was suspended before executing the task which owns the packet 50". This corresponds to a case where the task which owns the packet 50 is a spigned to an "idle" prooocssor. If the return bit is "1", it indicates that "another task was suspended before executing the task which owns the packet 50". This corresponds to a case where, since no "idle" processor exists, another task which was being executed in a processor was suspended in order for that processor to execute the task which owns the packet 50.

A return address is stored in the return address region 53 of the packet 50. The return address is referred to only when the return bit is "1". The return address indicates a return address to a suspended task.

A parameter for the task which owns the packet 50 is stored in the parameter region 54 of the packet 50.

A return value, which is the result of the task which owns the packet 50, is stored in the return value region 55 of the packet 50.

Figure 7:
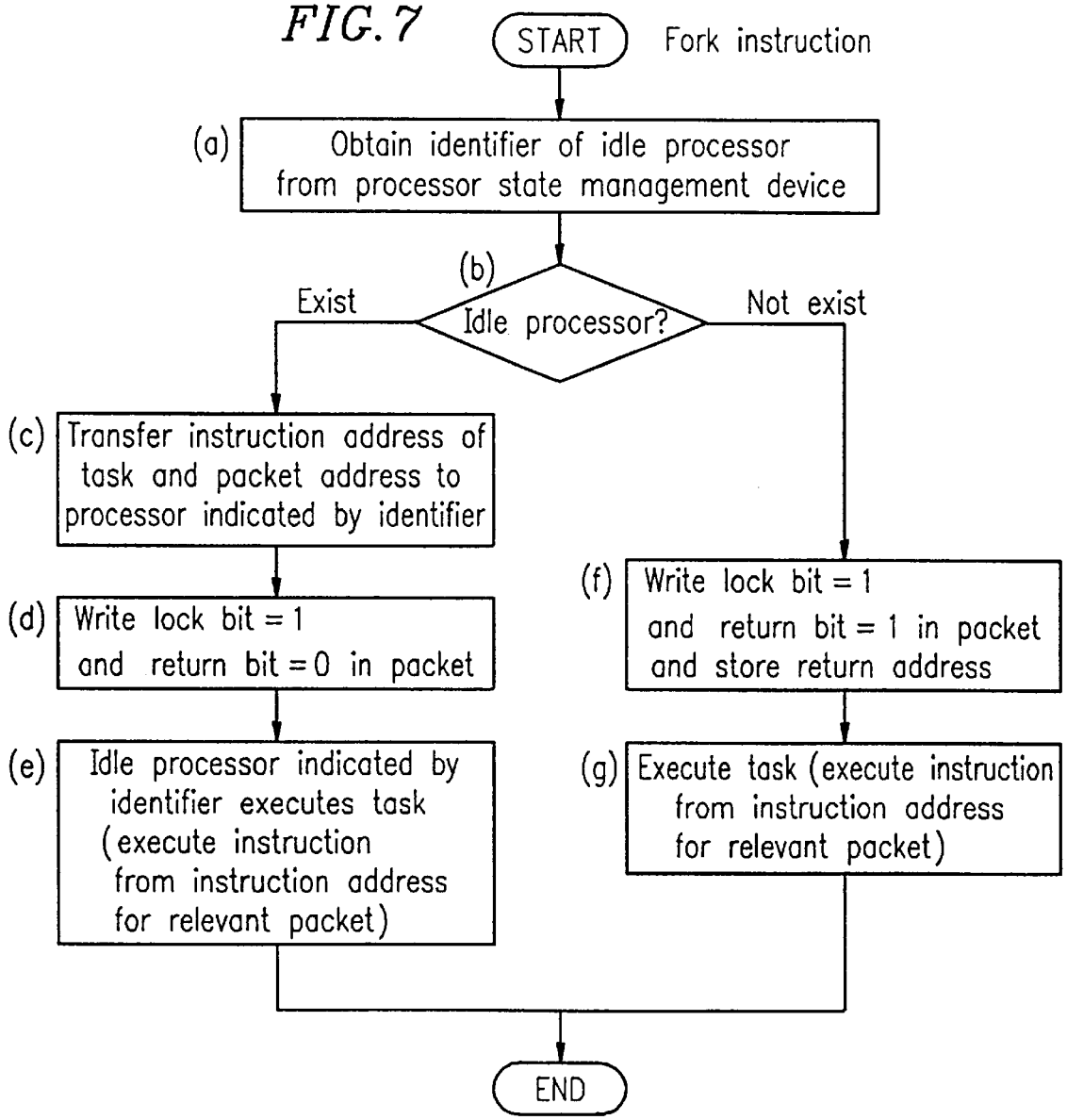
FIG. 7 is a diagram showing the procedure in which processors 30 to 32 interpret and execute a fork instruction.

FIG. 7 shows a procedure in which the processors 30 to 32 interpret and execute a fork instruction. The processors 30 to 32 read instructions in an instruction set stored in the main storage device 2. If an instruction which has been read is a fork instruction, the processors 30 to 32 perform a process shown in FIG. 7.

Hereinafter, the procedure in which the processor 30 interprets and executes a fork instruction will be described with respect to the respective steps thereof, with reference to FIG. 7. It will be appreciated that the same applies to the case where other processors 31 and 32 interpret and execute a fork instruction. A fork instruction utilizes the top address (hereinafter simply referred to as an "instruction address") of an instruction sequence indicating the content of the process performed by a new task and the address of the packet 50 of the new task (hereinafter simply referred to as a "packet address") as operands thereof.

Step (a): the processor 30 Inquires to the processor state management device 22 whether or not an "idle" processor exists. Such an inquiry is made by, for example, the processor 30 sending a request (REQ0=1) to the processor state management devicei 22. The processor state management device 22 determines whether or not an "idle" processor exists in response to that request.

If an "idler" processor exists, the processor state management device 22 returns the identifier of that "idle" processor to the processor 30. The identifier of an "idle" processor is obtained by, for example, the processor 30 referring to the value of ID0 output from the processor state management device 22. In the case where a plurality of "idle" processors exist, the identifier of the processor having the highest priority is obtained. In the case where a plurality of processors simultaneously interpret and exocuto a fork instruction, the processors interpret and execute the fork instruction in the descending order of their priorities. Thus, the processor 30 obtains the identifier of an "idle" processor.

If no "idle" processor exists, the processor state management device 22 returns a message that "no idle processor exists" to the processor 30. The message that "no idle processor exists" is obtained by, for example, the processor 30 referring to the value of NMP0 output from the processor state management device 22.

Step (b): If an "idle" processor exists, the processor 30 performs the process from Steps (c) to (e). If no "idle" processor exists, the processor 30 performs the process from Steps (f) to (g).

Step (c): Assuming that the "idle" processor is the processor 31, the processor 30 transfers the instruction address of a task and the packet address of the task which are provided as operands of the fork instruction to the processor 31 via the network 21.

Step (d): The processor 30 writes "1" in the lock bit region 51 of the packet 50 which is designated by the packet address of the task which is provided as an operand of the fork instruction, and writes "0" in the return bit region 52. Thereafter, the processor 30 completes the process of the fork instruction, and performs the process of a next instruction.

Step (e): The processor 31 receives the instruction address of a task and the packet address of the task from the processor 30 via the network 21. The processor 31, while referring to the packet 50 which is designated by the received packet address, begins processing an instruction which is designated by the received instruction address.

Through the above-mentioned Steps (a) to (e), the processor 30 independently performs a process which is different from the process performed by the processor 31. In other words, the processors 30 and 31 begin parallel processing. Thus, the process of the fork instruction ends here.

Step (f): The processor 30 writes "1" in the lock bit region 51 of the packet 50 which is designated by the packet address of the task which is provided as an operand of the fork instruction, and writes "1" in the return bit region 52. Moreover, the processor 30 writes the address of a next instruction of the fork instruction in the return address region 53. The processor 30 suspends the currently executed task.

Step (g): The processor 30, while referring to the packet 50 which is designated by the packet address of the task which is provided as an operand of the fork instruction, begins processing an instruction which is designated by the instruction address of the task provided as an operand of the fork instruction. Thus, the process of the fork instruction ends here.

Hereinafter, the procedure in which the processor 30 interprets and executes an unlock instruction will be described with respect to the respective steps thereof, with reference to FIG. 8. It will be appreciated that the same applies to the case where other processors 31 and 32 interpret and execute an unlock instruction.

Step (h): The processor 30 determines whether or not the value of the return bit region 52 of the packet 50 owned by the currently executed task is "0". If the value of the return bit region 52 is "0", it indicates that the processor 30 did not have any tasks suspended. Accordingly, when the value of the return bit region 52 is "0", the processor 30 performs the process of step (i). If the value of the return bit region 52 is "1", it indicates that the task of the processor 30 was suspended. Accordingly, when the value of the return bit region 52 is "1", the processor 30 performs the process of step (j).

Step (i): The processor 30 writes "0" in the lock bit region 51 of the packet 50 owned by the currently executed task, and changes the state of the processor 30 to "idle". The processor 30, which is now "idle", performs no further process. Thus, the process of the unlock instruction ends here.

Step (j): The processor 30 writes "0" in the lock bit region 51 of the packet 50 owned by the currently executed task. Furthermore, the processor 30 processes instructions from the address stored in the return address region 53, thereby restarting the suspended task. Thus, the process of the unlock instruction ends here.

Table 2 shows the manner in which the state of the multiprocessor system changes in response to the interpretation and execution of a fork instruction and an unlock instruction. In the example shown in Table 2, it is assumed that the multiprocessor system includes processors P1 and P2.

TABLE 2

| Event | Current state | | | | Next state | | | |
|---|---|---|---|---|---|---|---|---|
| | P1 | P2 | T1 | T2 | P1 | P2 | T1 | T2 |
| P1.fork | RUN T1 | IDLE | EX1 | STOP | RUN T1 | RUN T2 | EX1 | EX1 |
| P2.unlock | RUN T1 | RUN T2 | EX1 | EX1 | RUN T1 | IDLE | EX1 | STOP |
| P1.fork | RUN T1 | RUN other | EX1 | STOP | RUN T2 | RUN other | EX1 | EX2 |
| P1.unlock | RUN T2 | RUN other | EX1 | EX2 | RUN T1 | RUN other | EX1 | STOP |

Figure 9:
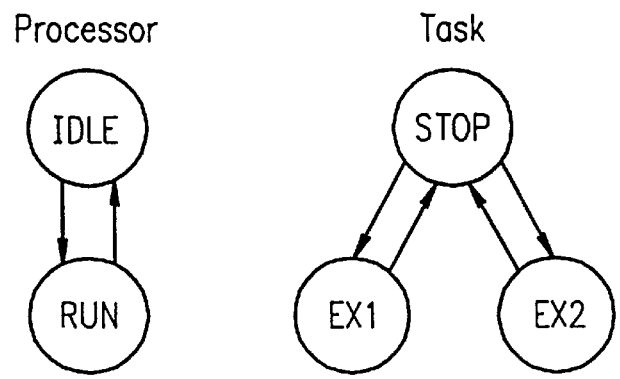
FIG. 9 is a diagram showing the states of processors and states of tasks.

As shown in FIG. 9, the states of the multiprocessor system are categorized into states of processors and states of tasks.

Each processor can take two states: an "idle" state (IDLE) and a "run" state (RUN). These states correspond to the states which are managed by the processor state management device 22. When a processor is in a "RUN" state, that processor is currently executing a task.

Each task can take three states: a "stopped" state (STOP), a 1st "executed" state (EX1), and a 2nd "executed" state (EX2). The "stopped" state (STOP) is a state where a processor is waiting to execute the task or a processor has finished execution of the task. The 1st "executed" state (EX1) is a state where no other task was suspended before the execution of a task which is currently executed. The 2nd "executed" state (EX2) is a state where another task was suspended before the execution of a task which is currently executed. When a processor is in a "run" state (RUN), the task which is being executed by that processor is in either the 1st "executed" state (EX1) or the 2nd "executed" state (EX2).

Referring back to Table 2, it will be described how the state of the multiprocessor system changes. The states of the multiprocessor system changes to a next state in response to the occurrence of an event and in accordance with the event and the current state. In Table 2, "Px. fork" indicates that an event "Processor Px has executed a fork instruction" occurred, and "Px. unlock" indicates that an event "Processor Px has executed an unlock instruction" occurred.

The first row of Table 2 illustrates that, in the case where the processor P1 is in a "run" state (i.e., executing a task T1) and the processor P2 is in a "idle" state, the task T1 being in a 1st "executed" state and the task T2 being in a "stopped" state, the state of the processor P2 changes from "idle" to "run" (i.e., executing the task T2) and the state of the task 2 changes from a "stopped" state to a 1st "executed" state, in response to an event "the processor P1 has executed a fork instruction". The reason for such changes of states is that as soon as the new task T2 is generated the task T2 is assigned to the "idle" processor P2.

The second row of Table 2 illustrates that, in the case where the processors P1 and P2 and the tasks T1 and T2 are currently in the "next states" as indicated in the first row, the state of the processor P2 changes from "run" (i.e., executing the task T2) to "idle" and the state of the task T2 changes from a 1st "executed" state to a "stopped" state, in response to an event "the processor P2 has executed an unlock instruction".

The third row of Table 2 illustrates that, in the case where the processor P1 is in a "run" state (i.e., executing the task T1) and the processor P2 is in a "run" state (i.e., executing another task), the task T1 being in a 1st "executed" state and the task T2 being in a "stopped" state, the state of the processor P1 changes from "run" (i.e., executing the task T1) to "run" (i.e., executing the task T2) and the state of the task T2 changes from a "stopped" state to a 2nd "executed" state, in response to an event "the processor P1 has executed a fork instruction". The reason for such changes of states is that as soon as the new task T2 is generated the execution of the task T1 is suspended and the execution of the task T2 is started.

The fourth row of Table 2 illustrates that, in the case where the processors P1 and P2 and the tasks T1 and T2 are currently in the "next states" as indicated in the third row, the state of the processor P1 changes from "run" (i.e., executing the task T2) to "run" (i.e., executing the task T1) and the state of the task T2 changes from a 2nd "executed" state to a "stopped" state, in response to an event "the processor P1 has executed an unlock instruction".

Hereinafter, the operation of the multiprocessor system 1 in the case of parallel-processing a program including a fork instruction and an unlock instruction will be described.

Figure 10:
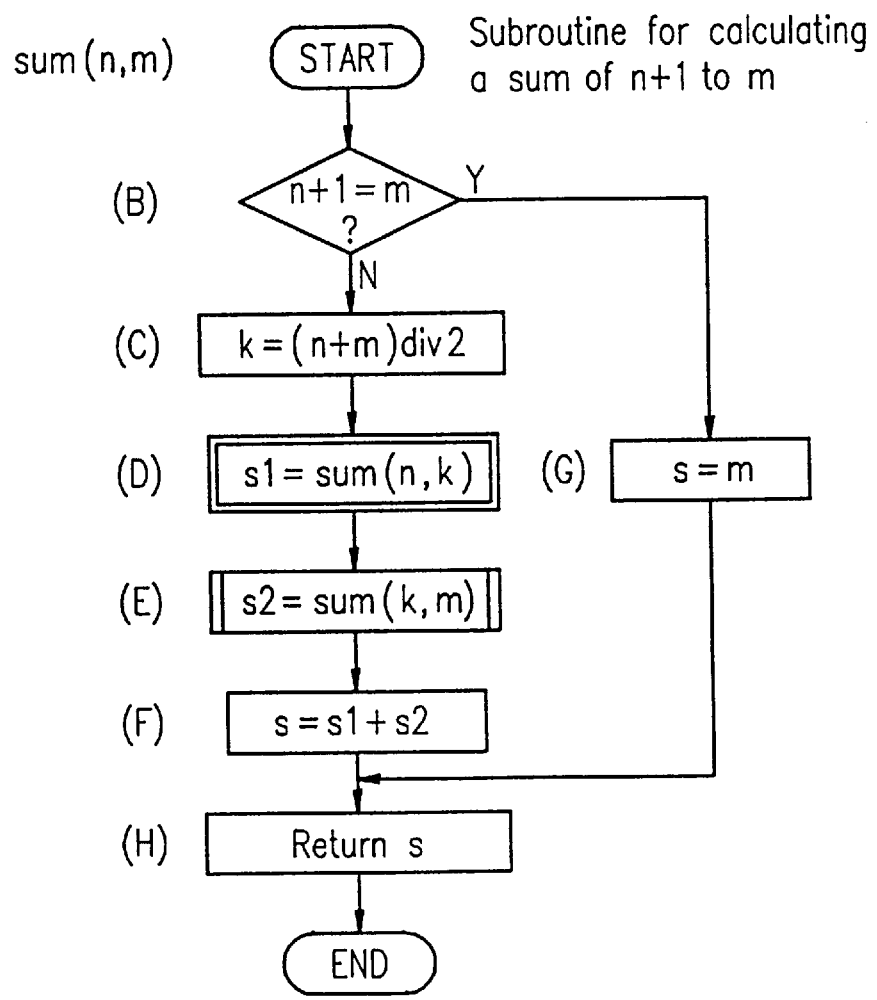
FIG. 10 is a diagram showing the procedure of a program for calculating the sum of 1 to 4 based on a binary tree.

FIG. 10 shows the procedure of a program for calculating a sum of 1 to 4 (i.e., 1+2+3+4) based on a binary tree. This program is divided into two portions main and sum; main is a main program, and sum is a subroutine which is capable of being recursively called and parallel-processed. The subroutine sum takes two parameters n and m so as to derive a sum of n+1 to m. The main program main calls sum with n–0 and m=4 as parameters.

First, it is assumed that the processor 30 is executing main. The processor 30 is in a "run" state. It is assumed that the processors 31 and 32 are in an "idle" state.

Hereinafter, the operation of the multiprocessor system 1 will be described in detail with respect to Steps (A) to (H) of the program.

Step (A): The processor 30 executes the subroutine sum with n=0 and m=4 as parameters thereof. Specifically, the processor 30 secures the packet 50 (Pk1) in the shared cache memory 20, and stores a value "0" and a value "4" in the parameter region 54 of that packet 50 (Pk1). Next, the processor 30 executes an exec instruction with the top address of the sum instructions and the top address of the packet 50 (Pk1) as operands thereof. Herein, an exec instruction is an instruction corresponding to only Steps (f) and (g) in the procedure for the fork instruction as shown in FIG. 7. The exec instruction utilizes the instruction address of a task and the packet address of the task as operands thereof, as in the case of a fork instruction.

The processor 30 writes "1" in the lock bit region 51 of the packet 50 (Pk1) and "1" in the return bit region 52 of the packet 50 (Pk1), and stores the address of a next instruction of the exec instruction in the return address region 53 (see Step (f) in FIG. 7). The processor 30 begins execution of the sum instructions while referring to the packet 50 (Pk1) (see Step (g) in FIG. 7).

Step (B): The processor 30 reads the parameters n and m from the packet 50 and compares (n+1) and m. If (n+1) and m are equal, the process proceeds to Step (G); otherwise the process proceeds to Step (C). When the subroutine sum was first called by main, (n+1) and m are not equal, so the process proceeds to Step (C).

Step (C): The processor 30 calculates k=(n+m) div 2. Since (n+m)=4, k equals 2.

Step (D): The processor 30 executes the subroutine sum by using n and k as parameters thereof. Specifically, the processor 30 secures the packet 50 (Pk2) in the shared cache memory 20, and stores the value n (=0) and the value k (=2) in the parameter region 54 of that packet 50 (Pk2). Next, the processor 30 executes a fork instruction with the top address of the sum instructions and the top address of the packet 50 (Pk2) as operands thereof.

The processors 31 and 32 are both "idle". The processor 30 obtains the identifier of the "idle" processor 31 in accordance with the respective priorities of the processors (see Stop (a) in FIG. 7). The processor 30 transfers the instruction address of a task and the packet address of the task to the processor 31 (see Step (b) in FIG. 7). The processor 30 writes "1" in the lock bit region 51 of the packet 50 (Pk2) and "0" in the return bit region 52 of the packet 50 (Pk2) (see Step (d) in FIG. 7). Furthermore, the processor 31 begins execution of the sum instructions while referring to the packet 50 (Pk2) (see Step (e) in FIG. 7). Thus, the processors 30 and 31 execute the subroutine sum in parallel.

Step (E): The processor 30 executes the subroutine sum by using k and m as parameters thereof. Specifically, the processor 30 secures the packet 50 (Pk3) in the shared cache memory 20, and stores the value k (=2) and the value m (=4) in the parameter region 54 of that packet 50 (Pk3). Next, the processor 30 executes an exec instruction with the top address of the sum instructions and the top address of the packet 50 (Pk3) as operands thereof. Before the processor 30 begins the execution of the exec instruction, the packet 50 (Pk1) is saved in a stack region.

The processor 30 writes "1" in the lock bit region 51 of the packet 50 (Pk3) and "1" in the return bit region 52 of the packet 50 (Pk3) (see Step (f) in FIG. 7). Furthermore, the processor 30 begins execution of the sum instructions while referring to the packet 50 (Pk3) (see Step (g) in FIG. 7).

Step (F): The processor 30 loads the packet 50 (Pk1) saved in the stack region after completing the execution of the subroutine sum, which was called in Step (E). Thereafter, the processor 30 adds s1 with s2, where s1 represents the result obtained by the subroutine sum executed in Step (D) (therefore s1 is stored in the return value region 55 of the packet 50 (Pk2)), and s2 represents the result obtained by the subroutine sum executed in Step (E) (therefore s2 is stored in the return value region 55 of the packet 50 (Pk3)). There is a possibility that the task which owns the packet 50 (Pk2) is still in a "run" state when the processor 30 has just finished executing the subroutine sum called in Step (E). The processor 30, after completing the execution of the task which owns the packet 50 (Pk2), reads the value stored in the return value region 55 of the packet 50 (Pk2), and substitutes that value in s1. Herein, s1 is 3. It is determined by referring to the value in the lock bit region 51 of the packet 50 (Pk2) whether or not the execution of the task which owns the packet 50 (Pk2) has been completed. If the value of the lock bit region 51 of the packet 50 (Pk2) is "0", it indicates that the execution of the task which owns the packet 50 (Pk2) has been completed.

Similarly, the processor 30, after completing the execution of the task which owns the packet 50 (Pk3), reads the value stored in the return value region 55 of the packet 50 (Pk3), and substitutes that value in s2. Herein, s2 is 7. The processor 30 calculates s1+s2, whereby s=10 is obtained.

Step (H): The processor 30 stores the value of s in the return value region 55 of the packet 50 (Pk1). Thereafter, the processor 30 executes the unlock instruction.

Figure 8:
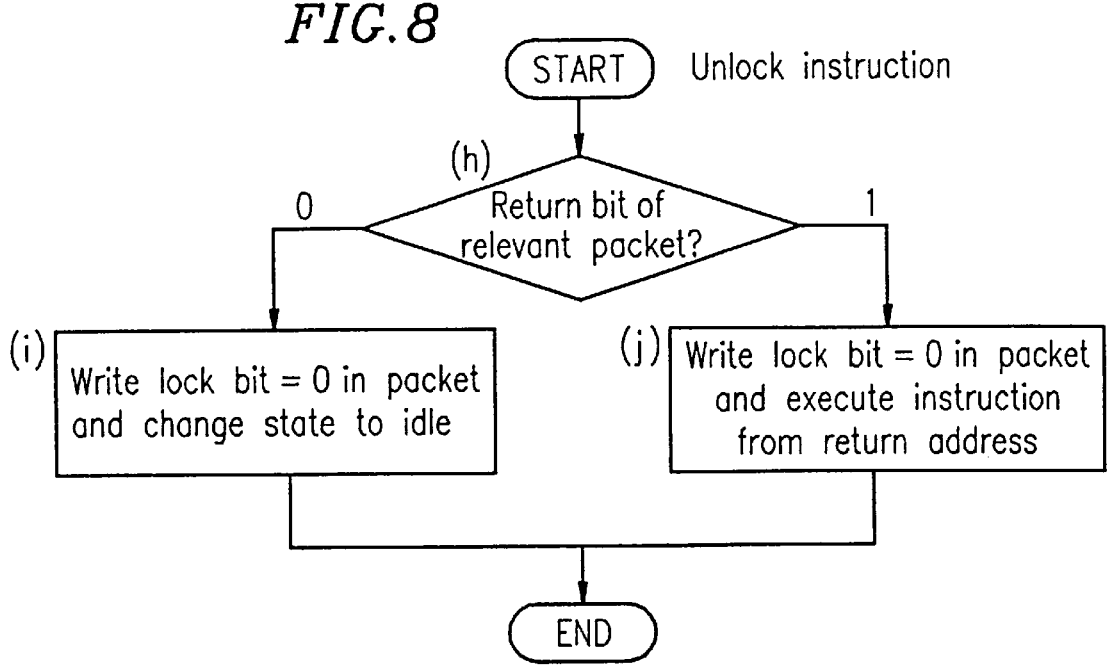
FIG. 8 is a diagram showing the procedure in which processors 30 to 32 interpret and execute an unlock instruction.

The processor 30 determines whether or not the value stored in the return bit region 52 of the packet 50 (Pk1) is "1" (see Step (h) in FIG. 8). Herein, the value stored in the return bit region 52 of the packet 50 (Pk1) is "1". Therefore, the processor 30 stores "0" in the lock bit region 51 of the packet 50 (Pk1) and executes instructions from the address stored in the return address regions 53 (see Step (j) in FIG. 8). In this case, the process is restarted from the next instruction of Step (A) of main.

Step (G): If n+1=m was determined to be true in Step (B), the process proceeds to Step (G). The processor 30 substitutes the value of the parameter m in s. Thereafter, the process proceeds to Step (H).

It should be noted that the above-described Steps (B) to (H) are executed also in the subroutine sum called in Step (D) and the subroutine sum called in Step (E) because the subroutine sum is a subroutine which is capable of being recursively called.

By thus recursively calling the subroutine sum, it becomes possible to parallel-calculating the sum of 1 to 4 (i.e., 1+2+3+4). In this example, two tasks are generated by the fork instruction in Step (D) and the exec instruction in Step (E). The fork instruction is an instruction which is used for assigning a task to any "idle" processor, as long as "idle" processors exist. The exec instruction is an instruction which is strictly used by a processor for assigning a task to itself.

Figure 11:
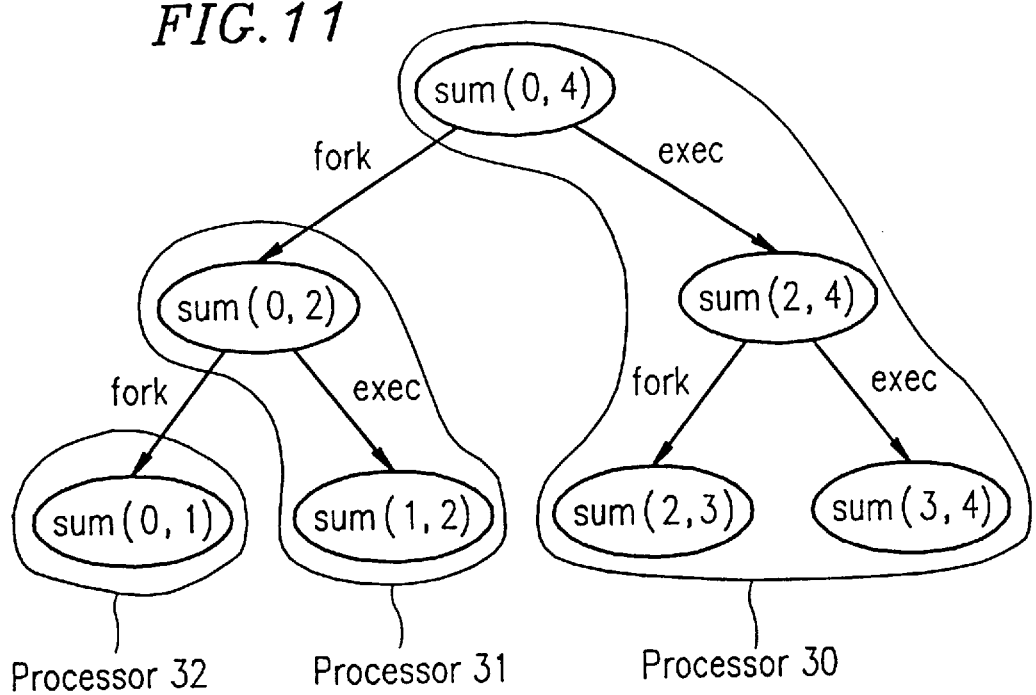
FIG. 11 is a diagram schematically showing the process content of Ahe program shown in FIG. 10.
Figure 12:
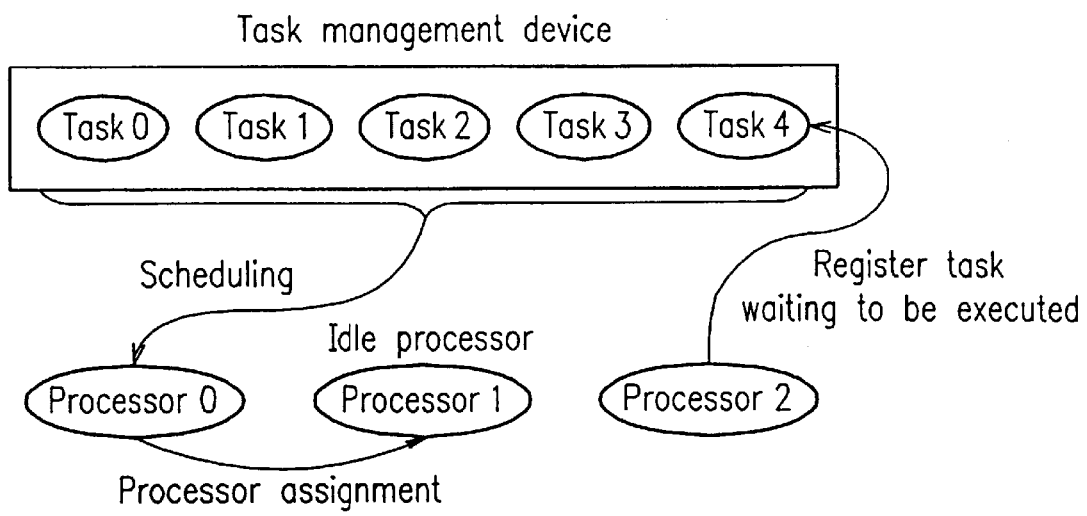
FIG. 12 is a diagram showing the operation of a conventional processor assignment method.
Figure 13:
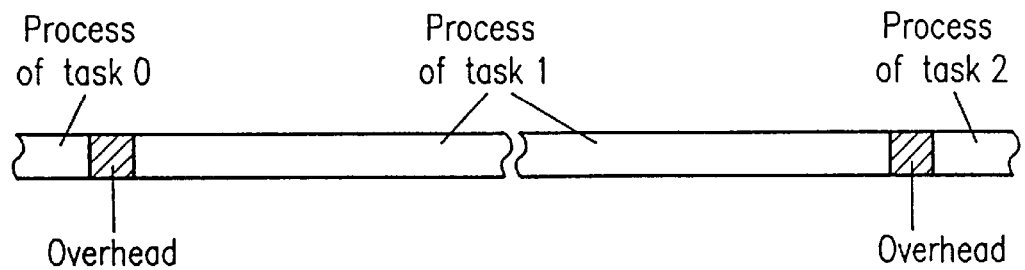
FIG. 13 is a timing diagram showing the execution time of tasks in relation to an overhead processing time, the tasks having medium to large coarseness degrees.
Figure 14:
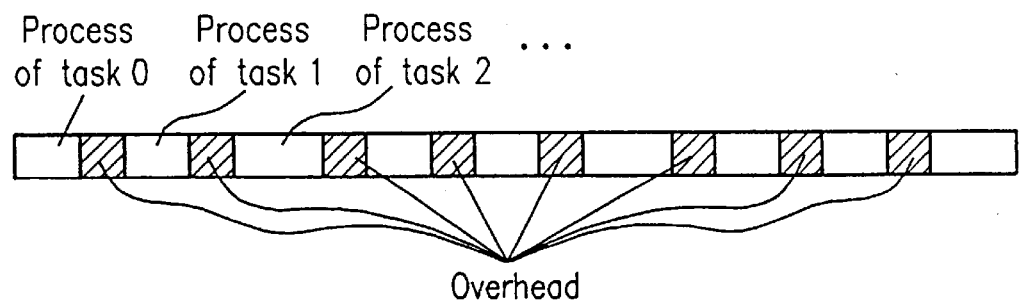
FIG. 14 is a timing diagram showing the execution time of tasks in relation to an overhead processing time, the tasks having a small coarseness degree.

FIG. 11 schematically shows the content of the above-mentioned process. As shown in FIG. 11, two tasks sum (0, 2) and sum (2, 4) are generated from a task sum (0, 4) by the fork instruction and the exec instruction. The task sum (0, 2) is assigned to the processor 31, and the task sum (2, 4) is assigned to the processor 30. Similarly, two further tasks are generated from each of the above two tasks. The tasks are assigned to other processors which are "idle", as long as such "idle" processors exist.

Tasks sum (2, 3) and sum (3, 4) are generated from the task sum (2, 4). However, both tasks sum (2, 3) and sum (3, 4) are assigned to the processor 30 because no "idle" processors exist any longer when assigning the task sum (2, 3).

As described above, each of the processors 30 to 32 of the multiprocessor system 1 according to the present invention interprets and executes a fork instruction, so as to assign a task to any "idle" processor that exists. When no "idle" processors exist, each processor suspends the execution of a currently executed task and assigns a task to itself. Thus, as soon as a task to be processed is generated, the generated task is assigned to either an "idle" processor or the processor which generated the task, thereby enabling the generated task to be immediately executed. As a result, any mechanism which conventional multiprocessor systems required for storing tasks to be processed becomes unnecessary, and any mechanism which conventional multiprocessor systems required for scheduling the execution order of tasks becomes unnecessary. In the case where an "idle" processor exists, the task to be processed is always assigned to that "idle" processor, thereby resulting in a high utilization efficiency of processors.

Furthermore, the fork instruction and the unlock instruction can be implemented by using simple hardware, which makes for high-speed processing.

Accordingly, the task execution method of the present invention is very effective in the case of parallel-processing a program in the multiprocessor system 1 implemented on an integrated circuit that requires a relatively small amount of time for processing the task itself as compared to the amount of time required for scheduling or managing tasks, e.g., the exemplified program for obtaining a sum of 0 to 4.

When an interruption is made from outside the integrated circuit, deterioration in the performance due to such an interruption can be prevented by detecting "idle" processors by means of the processor state management device 22 and by ensuring that the "idle" processor having the lowest priority handles the interruption process The processor state management device 22 is capable of detecting all the processors of the integrated circuit being in an "idle" state. In this case, a possible deadlock can be prevented by making one of the processors perform an exception handling.

As described above, according to the present invention, a task which is newly generated by a processor can be immediately begun by that processor or another processor. This makes unnecessary any mechanism for storing tasks to be processed or scheduling the execution order of tasks. This also makes unnecessary any process of selecting a task which is waiting to be executed and assigning the selected task to an "idle" processor.

As a result, a relatively small time is required for the assigning of tasks to processors as compared to the actual execution time of tasks. Thus, the process speed of parallel processing of a small coarseness degree in a multiprocessor system can be enhanced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for executing tasks in a multiprocessor system including a plurality of processors, each processor taking either an "idle" state and a "run" state, wherein the method comprises the steps of:
- when a first processor among the plurality of processors that is executing a first task newly generates a second task, the first processor detecting whether or not a second processor taking the "idle" state exists among the plurality of processors;
- assigning the second task, if a second processor taking the "idle" state is detected, to the second processor, so as to begin execution of the second task by the second processor, change the state of the second processor from the "idle" state to the "run" state, and store a flag having a first value indicating that the execution of the first task has not been suspended; and
- suspending, if no second processor taking the "idle" state is detected, the execution of the first task by the first processor, beginning execution of the second task by the first processor, and storing a flag having a second value indicating that the execution of the first task has been suspended.

2. A method according to claim 1 further comprising the steps of:
- determining whether the flag has the first value or the second value after the execution of the second task is completed;
- changing, if the flag is determined to have the first value, the state of the first processor from the "run" state to the "idle" state; and
- restarting, if the flag is determined to have the second value, the execution of the first task by the first processor where the execution of the first task was suspended.

3. A method according to claim 1, wherein each of the plurality of processors has an identifier for identifying the plurality of processors from one another, and the detection of the second processor taking the "idle" state is performed by using the identifiers.

4. A method according to claim 1, wherein each of the plurality of processors has a priority value for determining the priority thereof in task assignment, and the assignment of the second task to the second processor is performed based on the priority values.

5. A method for executing tasks in a multiprocessor system including a plurality of processors, each processor taking either an "idle" state and a "run" state, and each task taking either a "stopped" state, a first "executed" state and a second "executed" state,
wherein the method comprises the steps of:
- when a first processor among the plurality of processors that is executing a first task newly generates a second task, the first processor detecting whether or not a second processor taking the "idle" state exists among the plurality of processors;
- assigning the second task, if a second processor taking the "idle" state is detected, to the second processor, so as to begin execution of the second task by the second processor, change the state of the second processor from the "idle" state to the "run" state, and change the state of the second task from the "stopped" state to the first "executed" state; and
- suspending, if no second processor taking the "idle" state is detected, the execution of the first task by the first processor, beginning execution of the second task by the first processor, and changing the state of the second task from the "stopped" to the second "executed" state.

6. A method according to claim 5 further comprising the steps of:
- determining the stats of the second processor after the execution of the second task is completed;
- changing, if the second task is determined to be in the first "executed" state, the state of the second processor from the "run" state to the "idle" state and changing the state of the second task from the first "executed" state to the "stopped" state; and
- changing, if the second task is determined to be in the second "executed" state, the state of the second task from the second "executed" state to the "stopped" state.

7. A method according to claim 5, wherein each of the plurality of processors has an identifier for identifying the plurality of processors from one another, and the detection of the second processor taking the "idle" state is performed by using the identifiers.

8. A method according to claim 5, wherein each of the plurality of processors has a priority value for determining the priority thereof in task assignment, and the assignment of the second task to the second processor is performed based on the priority values.

9. A multiprocessor system comprising:
- a plurality of processors for parallel-processing a plurality of tasks; and
- a state managing device for managing states of the plurality of processors and returning an identifier of a processor in an "idle" state in response to an inquiry made by each of the plurality of processors,
wherein each of the plurality of processors inquires to the state management device as to whether or not a processor in the "idle" state exists when a new task has been generated.

10. A multiprocessor system according to claim 9, wherein the state management device includes means for changing a current state to a next state in response to the inquiry made by the processor and means for outputting a response to the inquiry based on the next state.

11. A multiprocessor system according to claim 9 further comprising an instruction cache memory and a data cache memory for each of the plurality of processors.

12. A multiprocessor system according to claim 9 further comprising a network for transferring an instruction address and a packet address among the plurality of processors.

13. A multiprocessor system according to claim 9, wherein each of the plurality of tasks has a small coarseness degree.

14. A multiprocessor system comprising:
- a plurality of processors for parallel-processing a plurality of tasks; and
- a state managing device for managing states of the plurality of processors and returning an identifier of a processor in an "idle" state in response to an inquiry made by one of the plurality of processors,
wherein, when a first processor among the plurality of processors that is executing a first task newly generates a second task, the first processor inquires to the state management device as to whether or not a second processor in the "idle" state exists among the plurality of processors.

* * * * *